US006801754B2

(12) United States Patent
Talwalkar et al.

(10) Patent No.: US 6,801,754 B2
(45) Date of Patent: Oct. 5, 2004

(54) INTELLIGENT REPEATER AND METHOD TO PROVIDE INCREASED SIGNALING

(75) Inventors: Sumit A. Talwalkar, Plantation, FL (US); Vijay Nangia, Schaumburg, IL (US); Leng H. Ooi, Plantation, FL (US)

(73) Assignee: Motorola Inc., Schaumburg, IL (US)

( * ) Notice: Subject to any disclaimer, the term of this patent is extended or adjusted under 35 U.S.C. 154(b) by 453 days.

(21) Appl. No.: 09/781,212

(22) Filed: Feb. 13, 2002

(65) Prior Publication Data

US 2002/0137458 A1 Sep. 26, 2002

(51) Int. Cl.$^7$ ................................................ H04B 1/38
(52) U.S. Cl. ........................ 455/15; 455/11.1; 455/550
(58) Field of Search ..................... 455/15, 13.4, 522, 455/16, 13.1, 12.1, 13.2, 550, 466; 370/327, 341

(56) References Cited

U.S. PATENT DOCUMENTS

| | | | | |
|---|---|---|---|---|
| 4,682,367 A | * | 7/1987 | Childress et al. ............. 455/17 |
| 5,355,366 A | | 10/1994 | Li et al. | |
| 5,408,680 A | * | 4/1995 | Hattey et al. .................. 455/15 |
| 5,459,761 A | * | 10/1995 | Monica et al. ............... 375/211 |
| 5,526,376 A | * | 6/1996 | Kellenberger et al. ...... 375/211 |
| 5,644,577 A | | 7/1997 | Christensen et al. | |
| 5,697,049 A | | 12/1997 | Shiraishi et al. | |
| 5,845,196 A | * | 12/1998 | Nawata ........................ 455/71 |
| 5,867,109 A | * | 2/1999 | Wiedeman .................. 455/13.1 |
| 5,907,794 A | * | 5/1999 | Lehmusto et al. .......... 455/11.1 |
| 6,052,558 A | * | 4/2000 | Cook et al. ................. 455/12.1 |
| 6,188,719 B1 | * | 2/2001 | Collomby .................... 375/211 |
| 6,529,486 B1 | * | 3/2003 | Barnes et al. ................ 370/327 |
| 6,539,028 B1 | * | 3/2003 | Soh et al. .................... 370/445 |
| 2001/0031624 A1 | * | 10/2001 | Schmutz ..................... 455/13.4 |
| 2002/0028655 A1 | * | 3/2002 | Rosener et al. ............... 455/16 |

* cited by examiner

Primary Examiner—Nick Corsaro
Assistant Examiner—Trinh Tan
(74) Attorney, Agent, or Firm—Frank M. Scutch, III; Matthew C. Loppnow (57) ABSTRACT

A system and method are disclosed to provide increased signaling in a communications system. A repeater system is operable to receive and store operating characteristic data from a communications unit, the repeater transmitting at least some of the stored operating characteristic data during a detected break in transmission.

26 Claims, 7 Drawing Sheets

INTELLIGENT REPEATER AND METHOD TO PROVIDE INCREASED SIGNALING

TECHNICAL FIELD

The present invention generally relates to wireless communications, and in particular to an intelligent repeater and method to provide increased signaling.

BACKGROUND OF THE INVENTION

Repeater technology is employed to increase the range of communication between radio communications units. A repeater can used for communications over a single operating frequency or communications between parties over differing frequencies, such as in a trunked radio communications system.

A trunked communication system generally includes a plurality of communications units, a limited number of communication resources that are transceived via one or more repeaters (or base stations) and a communication resource allocator that allocates the limited number of communication resources among the plurality of communications units. The communications units can be portable radios and/or mobile radios. Communications occurs directly between communications units or the communications is processed through a repeater. The communication resources comprise a TDM (time-division multiplexed) bus, a carrier frequency, a pair of carrier frequencies, or any other RF (radio frequency) transmission means.

Generally, trunked two-way communication systems provide mobile and portable communications units with wireless services similar to many wired communication networks. For example, a trunked system includes full-duplex telephone voice communication, two-way mobile-to-mobile group dispatch communication, and two-way mobile-to-dispatcher group dispatch communication. A typical trunked communication system site, where each different site has a different physical location, can include a number of full-duplex repeaters.

Communications between units is initiated by a calling (or initiating) unit transmitting call set up information. The call set up information identifies the recipient(s) of the transmission by corresponding identification numbers. The calling unit further sends forward channeling information, which identifies channels (or frequencies) over which the units are to communicate (typically a low bit rate communication). The call set up and forward channeling information are received at a recipient unit directly from the calling unit or through a repeater. Typically, the repeater receives and retransmits communication signals for receipt by the intended units. An undesirable consequence of using a repeater is delays between receipt of signals and their retransmission, which, in turn, causes decreased signaling in the system.

DETAILED DESCRIPTION OF THE INVENTION

The present invention will now be described with reference to the drawings, wherein like reference numerals are used to refer to like elements throughout. The present invention relates to an intelligent repeater system operable to receive and store information from a communications unit in a communications system. The repeater is programmed and/or configured to take advantage of a detected break in transmission within the system and transmit signals based on the stored information. As a result, signaling within the communications system can be increased.

Figure 1:
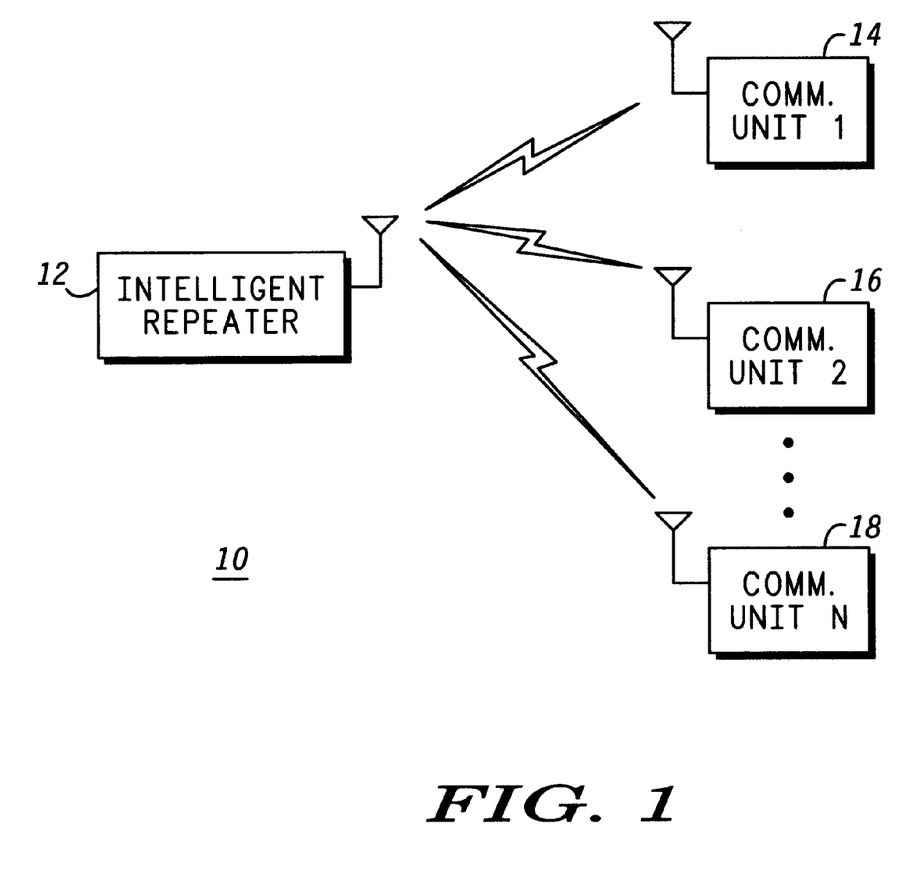
FIG. 1 is a schematic block representation of a communications system having a repeater in accordance with the present invention.

FIG. 1 illustrates a schematic block diagram of a system 10 in which an intelligent repeater 12, in accordance with an aspect of the present invention, is implemented. The system 10 includes the intelligent repeater 12 and two or more communications units 14, 16, and 18 that communicate with each other through radio frequency (RF) signals. The RF signals can be modulated using any known analog or digital modulation technique, such as frequency modulation (FM), amplitude modulation (AM), a combination of FM and AM. The communications units 14, 16, and 18, for example, are mobile radios or portable radios. The communications units 14, 16, and 18 modulate the RF signals upon a selected carrier frequency, such as to transmit or receive voice signals in a half duplex manner.

While, for purpose of simplicity of illustration, three communications units 14, 16, and 18 are shown, it is to be understood and appreciated that any number of units can be utilized in such a system. Additionally, while the communications units 14, 16, and 18 are described as employing half duplex communication, it is to be appreciated that the present invention also is applicable to full duplex communication.

The communications units 14, 16, and 18 communicate with each other directly or through the repeater 12. The repeater 12 receives transmitted signals from one or more of the communications units 14, 16, 18 and retransmits the signals so as to increase the overall range of the system 10.

By way of example, the communications system 10 employs a communications protocol, such as the European Digital Standard DIIS, which is being developed by the European Telecommunications Standards Institute. One proposed feature of the DIIS protocol is a periodic break in transmission. The break in transmission is implemented by a communications unit 14 that has initiated a call to one or more of the other communications units 16, 18. In steady state operation, for example, the communications unit 14 turns its transmitter OFF for about 40 milliseconds once every 720 milliseconds and enters a receive mode. In order for another communications unit 16 or 18 to interrupt the communications unit 14, the interrupting unit utilizes the 40 millisecond window to send a message called a transmit interrupt (TI) message.

Another feature of the DIIS protocol is a late entry (LE) message. The initiating communications unit 14 transmits a LE signal having information to facilitate entry of an identified communications unit(s) into a call that is already in progress. The initiating communications unit can periodically transmit the LE signal. The LE signal, for example, includes an identification (ID) number of the initiating communications unit 14 as well as ID numbers for each other receiver 16, 18 that can enter the call. In addition to LE information, the initiating communications unit also transmits low speed data, which can include forward channeling (FCH) information.

Figure 2:
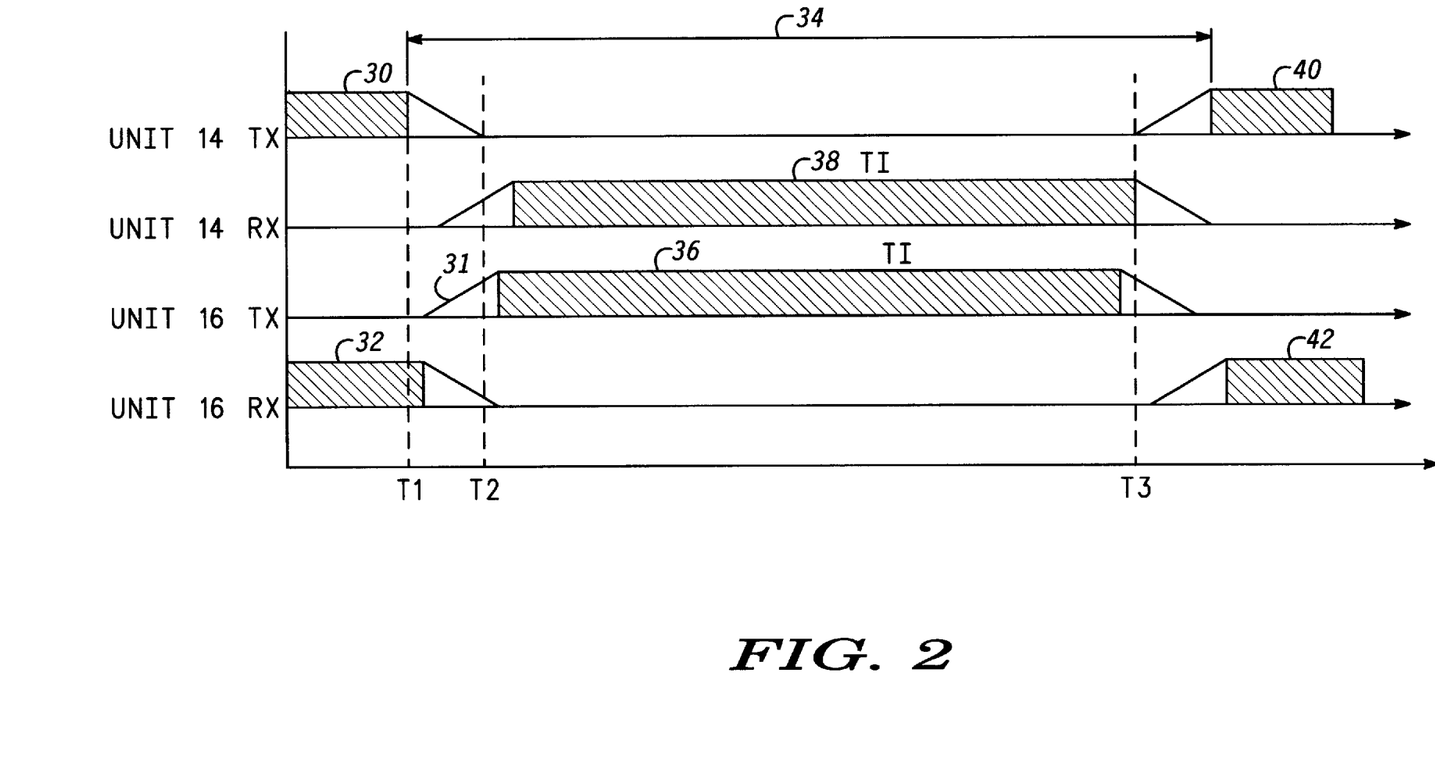
FIG. 2 is an example of a signal diagram for communication signals between communications units without a repeater.

FIG. 2 is an example of a timing diagram for transmitted (TX) and received (RX) signals for two communications units 14 and 16 implementing the above-described protocol in the absence of a repeater (e.g., direct communication between the units). For example, the communications unit 14, which has initiated the call, transmits a data signal, indicated at 30, until time $T_1$, when the transmitter ramps to an OFF condition. A corresponding signal 32 is received by the communications unit 16. A small delay can occur due to propagation and processing delays of the transmitted and received signals. A break in transmission, such as a periodic break implemented at the communications unit 14, is indicated at 34 by the absence of a transmitted signal by the unit 14.

As mentioned above, the communications unit 16, for example, switches the transmitter to an ON condition (indicated by ramp 31) and begins transmitting, at time T2, a transmit interrupt (TI) message 36 during the break in transmission 34. A corresponding message 38 is received at the communications unit 14. At time T3 near the end of the break in transmission 34, the communications unit 14 ramps up its transmitter to the ON condition to once again transmit data, indicated at 40, which is received at the unit 16 as signal 42.

Figure 3:
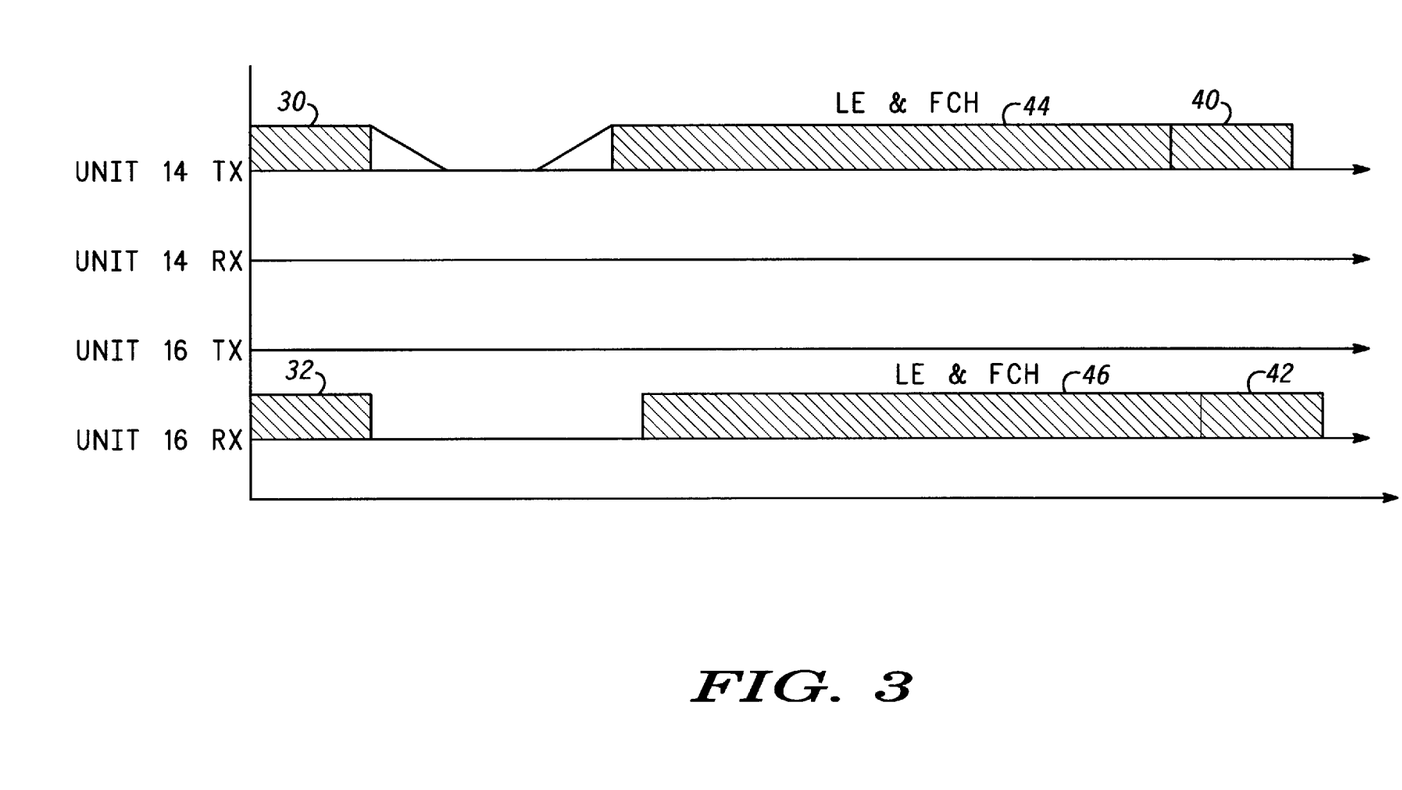
FIG. 3 is another example of a signal diagram for communication signals between communications units without a repeater.

FIG. 3 is a signal diagram illustrating a situation when the communications unit 16 does not desire to send a transmit interrupt message during a break in transmission implemented at the initiating communications unit 14. As a result, the transmission break is utilized by the unit 14 to send other information. For example, the communications unit 14 sends a signal that contains LE information and/or FCH information 44. More particularly, the communications unit 14 detects the lack of a TI message from any of the recipient communications units 16, 18 and, in turn, transmit the LE and FCH messages 44 during the remainder of the break in transmission. A corresponding signal having a message 46 indicative of the LE and FCH information is received at the communications unit 16.

Figure 4:
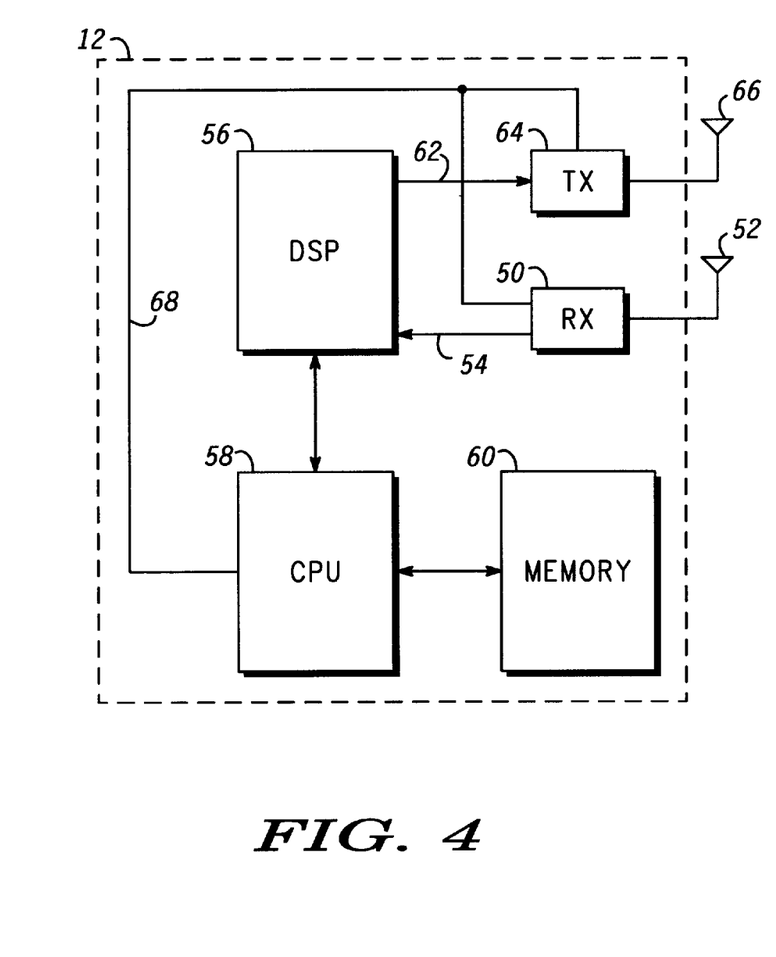
FIG. 4 is functional block diagram illustrating an example of a repeater system to increase signaling in accordance with the present invention.

As mentioned above, a repeater 12 facilitates communications from an initiating communications unit 14 to one or more recipient communications units 16 and 18 (FIG. 1). FIG. 4 is a schematic block diagram of the intelligent repeater 12 configured and/or programmed in accordance with an aspect of the present invention, to increase signaling in the communications system 10. The repeater 12 includes a receiver 50 operatively coupled to an antenna 52 for receiving signals from the communications units 14, 16, 18 (FIG. 1) in its associated system. The receiver 50 provides an output signal 54 to a signal processor 56, which can be a digital signal processor (DSP). The signal processor 56 is operable to demodulate, decode and/or process the receiver output signal 54.

The signal processor 56 is operatively coupled to a central processing unit (CPU) 58, such as a microprocessor. The signal processor 56 extracts control information from the signal 54 and transfer the extracted data to the CPU 58. The CPU 58 is operatively coupled to a memory device 60 that is operable to store data. The memory device 60 can be RAM or other suitable type of memory device. The CPU 58 stores in the memory 60 desired control information that has been extracted from the receiver output signal 54.

The signal processor 56 and/or the CPU 58 also are operative to detect when no signal is being received from the communications units of a current call session. Accordingly, the signal processor 56 provides a signal to the CPU 58 indicative of when no such signals are being received, such as during a break in transmission at one or more of the communications units. Alternatively, or additionally, the CPU 58 can make such determination based on the data received from the signal processor 56 or received directly from the receiver 50.

The CPU 58 also retrieves information stored in the memory 60, which, for example, includes LE information, and/or power control information. The CPU 58 provides the retrieved information to the signal processor 56. The signal processor 56, in turn, modulates and encodes the information and provides an output signal 62 to a transmitter 64. The transmitter 64 is operatively coupled to an antenna 66 for transmitting received data from the intelligent repeater 12 to the communications units 14, 16, and 18 within its system. The transmitted signals include a combination of a retransmission of a signal received from one of the communications units and a transmission originating at the repeater 12.

The CPU 58 controls operation of the transmitter 64 and receiver 50, such as by providing appropriate control information over a control bus 68. The control bus 68 provides back to the CPU 58 information indicative of the operating characteristics of the receiver 50 and/or transmitter 64. One or more additional memory devices (not shown) can be utilized by the CPU 58 for storing computer-executable instructions to control operation of the repeater 12 and the component parts thereof. The repeater 12, for example, is formed of two conventional communications units; one unit 50 for receiving RF signals and the other unit 64 for transmitting signals.

Referring between FIGS. 1 and 4, for example, an initiating communications unit 14 transmits a call set up signal that is received at an intelligent repeater 12, in accordance with an aspect of the present invention. The call set up signal includes call set up information, which can include LE information and/or other information (e.g., operating characteristic data) that might be transmitted by an initiating communications unit. As mentioned above, the LE information facilitates entry of other communication units into a call already in progress. Call set up information also can include synchronization information for the call as well as provide information indicating the occurrence of periodic breaks in transmission at the initiating unit. The repeater 12 demodulates and decodes the received call set up signal and extracts pertinent information from the signal. The extracted information is stored in the memory 60 associated with the intelligent repeater 12.

The repeater 12, which operates in a full duplex mode, is operable to detect if any of the communications units 16, 18 send a TI message during a scheduled break in transmission. If no communications unit 16, 18 sends a TI message during a break in transmission, the repeater 12 is operable to send LE information during the break in transmission, in accordance with an aspect of the present invention. Additionally, the repeater 12 sends power control information intended for the initiating unit 14 during the scheduled break in transmission, which helps to increase battery life at the communications units. The repeater 12 also can transmit other information during the break in transmission based on the data stored in the memory 60 or based on signals (e.g., FCH information) received from the initiating unit 14.

Figure 5:
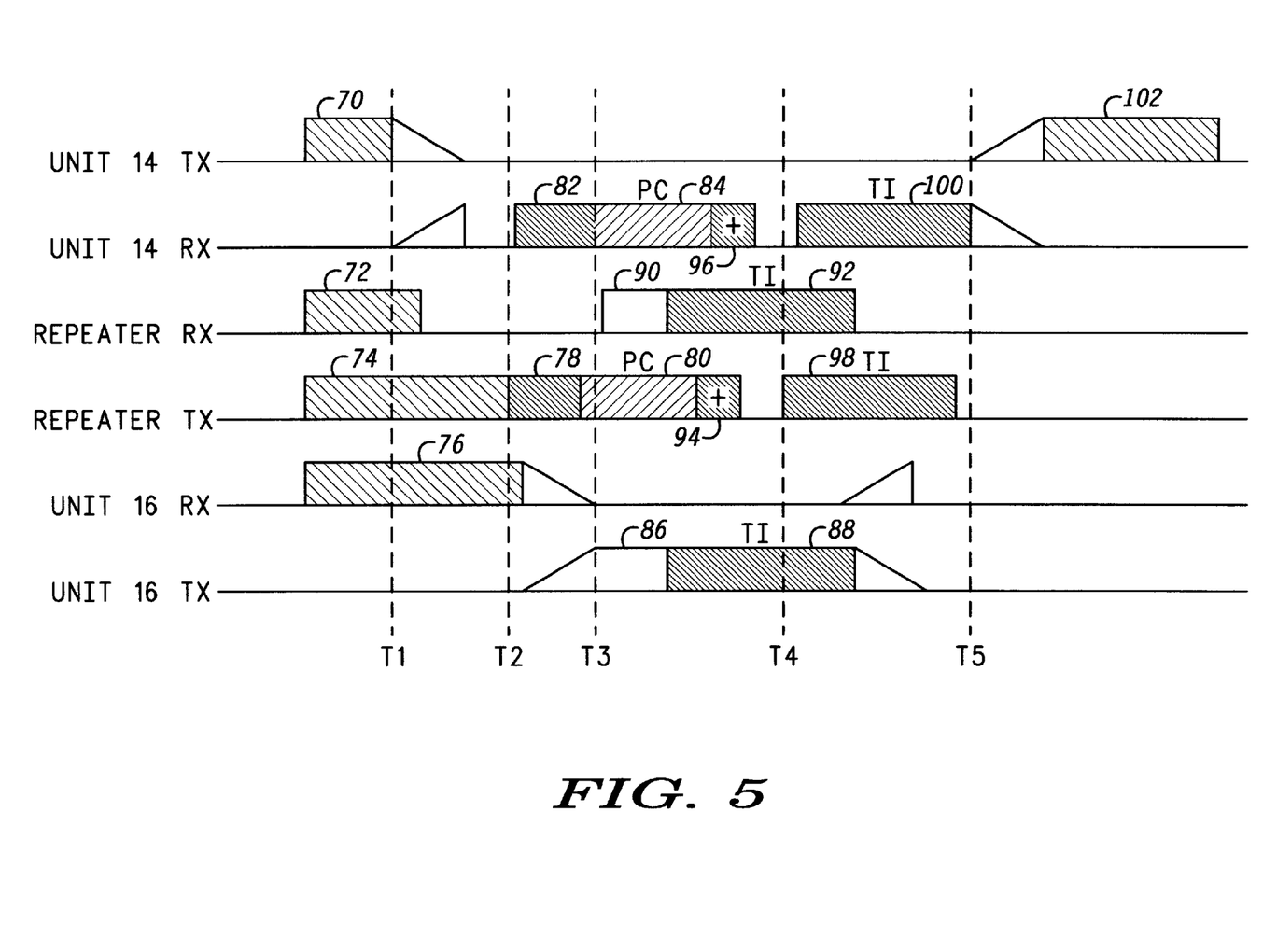
FIG. 5 is an example of a signal diagram for communication signals between communications units through a repeater in accordance with the present invention.

FIG. 5 is an example of a timing diagram for transmitted (TX) and received (RX) signals for communications units 14 and 16 communicating via the repeater 12, in accordance with an aspect of the present invention. In this example, the communications unit 14 has initiated a call and the communications unit 16 wishes to send a TI message during a break in transmission. At time T1, during a break in transmission, the communications unit 14 stops transmitting a data signal 70 and ramps its transmission to an OFF condition and ramps its receiver to an ON condition. The repeater 12 receives the transmitted signal, indicated at 72, from the communications unit 14 and retransmits the signal, indicated at 74, which is received at the communications unit 16 as signal 76.

At time T2, after transmitting the signal 74 and during the break in the transmission, the repeater 12 transmits a synchronization message 78 followed by a power control message 80. The synchronization message 78 and power control message 80 are received as respective signals 82 and 84 at the communications unit 14.

At time T3, after ramping up its transmission to an ON condition, the communications unit 16 transmits a synchronization message 86 followed by a TI message 88. The signals 86 and 88 are received at the repeater 12, respectively as messages 90 and 92. In response to the received signals 90 and 92, the repeater 12 transmits a TI (+) flag sequence 94 to the initiating unit 14 following the power control information 80. The TI flag sequence 94 is received at the communications unit 14 as a TI message 96. The TI message 96 instructs the communications unit 14 not to transmit FCH information during its break in transmission and to remain in the receive mode to receive regular data that is to be processed using an appropriate processing algorithm.

The TI flag message 94, 96 can be a single bit or a sequence of symbols depending on, for example, the correlation algorithm being employed at the communications unit to detect and decode the sequence. By way of example, a correlator detector has a smaller delay than a maximum likelihood sequence estimator (MLSE). A smaller sequence of symbols or a bit could be employed if an MLSE algorithm were employed to detect the sequence, although processing time can be increased accordingly.

At time T4, the repeater 12 transmits a TI message 98 to the communications unit 14 according to the received TI message 92. It is to be noted that the repeater does not have to resend the synchronization message 90 received with the transmit interrupt message from the communications unit 16, as the communications unit 14 has already been synchronized with the repeater via synchronization messages 78, 82. A TI message 100 is received at the communications unit 14 during the break in transmission. At time T5, after receiving the TI message frame 100, the communications unit 14 ramps up its transmitter to an ON condition and ramp down its receiver to an OFF condition so as to begin transmitting data, indicated at 102.

Figure 6:
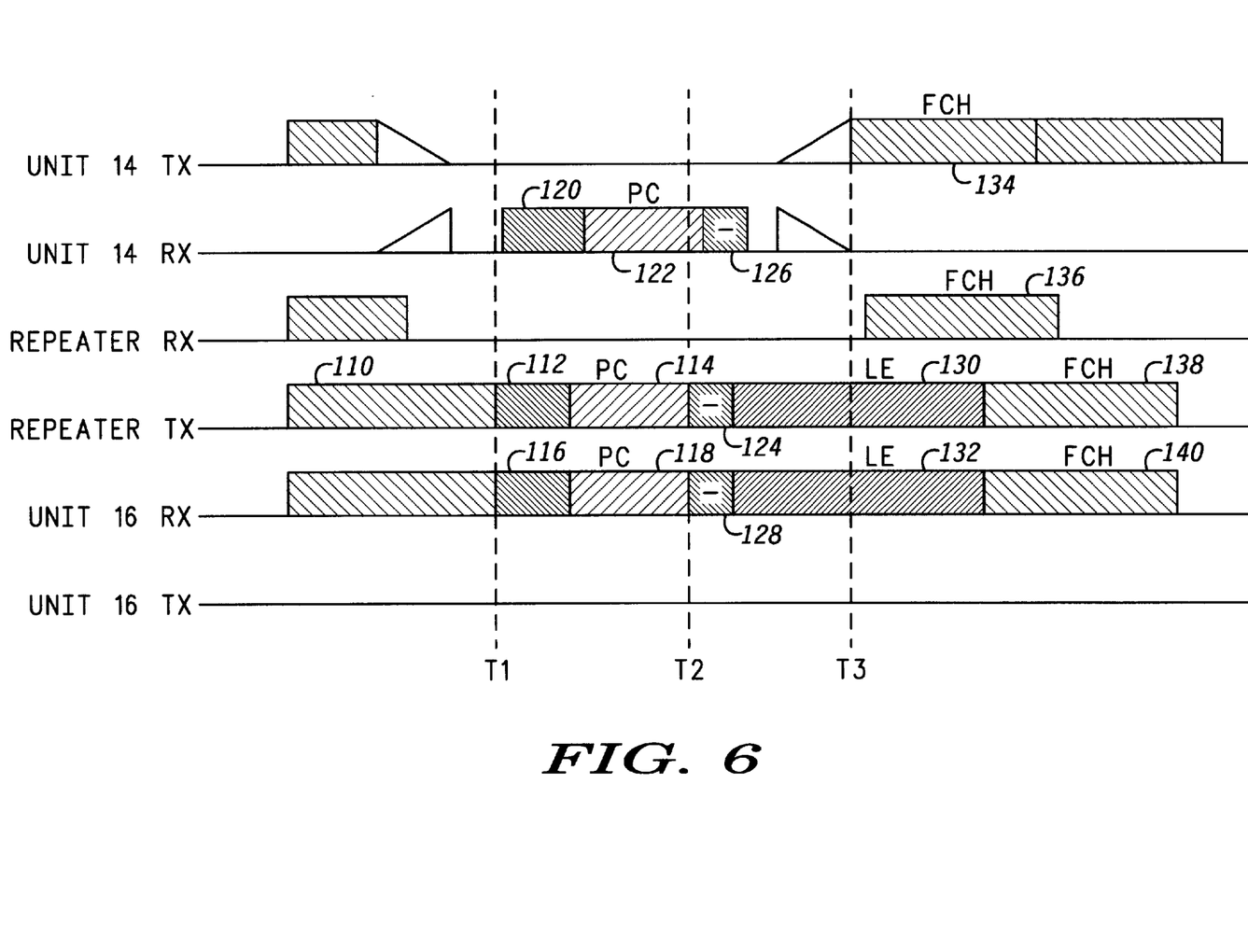
FIG. 6 is another example of a signal diagram for communication signals between communications units through a repeater in accordance with the present invention.

FIG. 6 is a timing diagram, similar to FIG. 5, illustrating a situation in which a receiving communications unit 16 does not transmit during a scheduled break in transmission at the initiating communications unit 14. At time T1, after the repeater 12 retransmits data received from the unit 14, indicated at 110, the repeater begins transmitting a synchronization message 112 and a power control message 114. Because the communications unit 16 does not transmit during the break in communication, it remains in the receive mode to receive corresponding synchronization and power control messages 116 and 118 from the repeater 12. The communications unit 14 also receives synchronization and power control messages 120 and 122, respectively, from the repeater 12.

At time T2, following transmission of the power control message 114, the repeater 12 transmits a TI (−) flag sequence 124 indicating that a TI message is not going to be transmitted. That is, the repeater 12 determines that none of the receiving unit(s) 16, 18 desire to transmit during the detected break in transmission based on an absence of transmission (e.g., no synchronization message or a TI message) during the break in transmission. Corresponding messages 126 and 128 are received at the communications units 14 and 16, respectively. The appended message sequence 126 prompts the communications unit 14 to turn its receiver down and to ramp its transmitter up so as to send FCH information and/or other operating characteristic data.

The repeater 12 sends a LE message 130 following the TI sequence flag 124 during the break in transmission. Advantageously, the LE information does not have to come from the communications unit 14 that initiated the call, as the LE information is stored in memory 60 at the repeater 12. The communications unit 16, in turn, receives the LE information, indicated at 132, from the repeater 12. As a result, the LE information is received without additional propagation delays and processing delays at the repeater so that signaling can be increased.

At time T3, the communications unit 14 transmits the FCH message 134, which is received at the repeater 12, indicated at 136. The repeater 12, in turn, appends the FCH information 138 at the end of the LE information 130 that it transmits. The communications unit 16 receives corresponding FCH information 140 from the repeater 12.

In view of the foregoing, those skilled in the art will appreciate that an intelligent repeater, in accordance with an aspect of the present invention, enables more information to be transmitted to the communications units in a given period of time than if the intelligent repeater were not utilized. In particular, the LE information and power control information would typically be sent from the initiating communications unit through a non-intelligent repeater. This approach would add undesirable propagation delays, delays in the repeater retransmitting the received information, and/ or additional correlation detection delays for each frame of power control information, TI flag sequence and/or LE information being received and transmitted by the repeater. Employing an intelligent repeater in accordance with an aspect of the present invention mitigates such delays. As a result, more efficient and increased signaling is achieved in a system configured in accordance with the present invention.

The maximum allowed lengths of the power control (PC), TI, LE, FCH messages depend on assumptions on a propagation time ($T_{PROP}$), repeater delay ($R_{DELAY}$), the correlation detection time ($T_{CORR}$) and the TI indicator sequence length ($T_{TI\_FLAG}$). The $T_{CORR}$ time further can depend on the type of correlation algorithm utilized to detect a frame and the length of the frame. Assuming that the break in transmission is 40 ms, that the length of the synchronization word is 5 ms and the TX and RX ramp time are each 5 ms, the maximum time lengths can be expressed as:

$$PC_{MAX}=2t_{PROP}+T_{CORR}+5$$

$$TI_{MAX}=40-4T_{PROP}-2R_{DELAY}-15$$

$$LE_{MAX}=2T_{PROP}+R_{DELAY}+T_{CORR}+5; \text{ and}$$

$$FCH_{MAX}=25-4T_{PROP}-R_{DELAY}-2T_{CORR}-T_{TI\_FLAG}$$

Table I illustrates two examples of maximum allowed durations for different types of frames that, based on the foregoing expressions, are sent during the break in transmission. Time is indicated in milliseconds. It will be appreciated that the combined time for LE and FCH information can be increased from about 8 ms to about 25 ms by employing an intelligent repeater in accordance with the present invention. This is because the LE information is stored at the repeater and, thus, retransmission of the LE and/or PC information from unit 14 is not required.

TABLE I

Possible durations of various frames

| | $R_{DELAY}$ | $T_{CORR}$ | $T_{PROP}$ | $T_{TI-FLAG}$ | $PC_{MAX}$ | $TI_{MAX}$ | $LE_{MAX}$ | $FCH_{MAX}$ |
|---|---|---|---|---|---|---|---|---|
| Case 1 | 5 | 1.25 | 0.25 | 2 | 6.75 | 14 | 11.75 | 14.5 |
| Case 2 | 7 | 2 | 0.25 | 2 | 7.5 | 10 | 14.5 | 11 |

Figure 7:
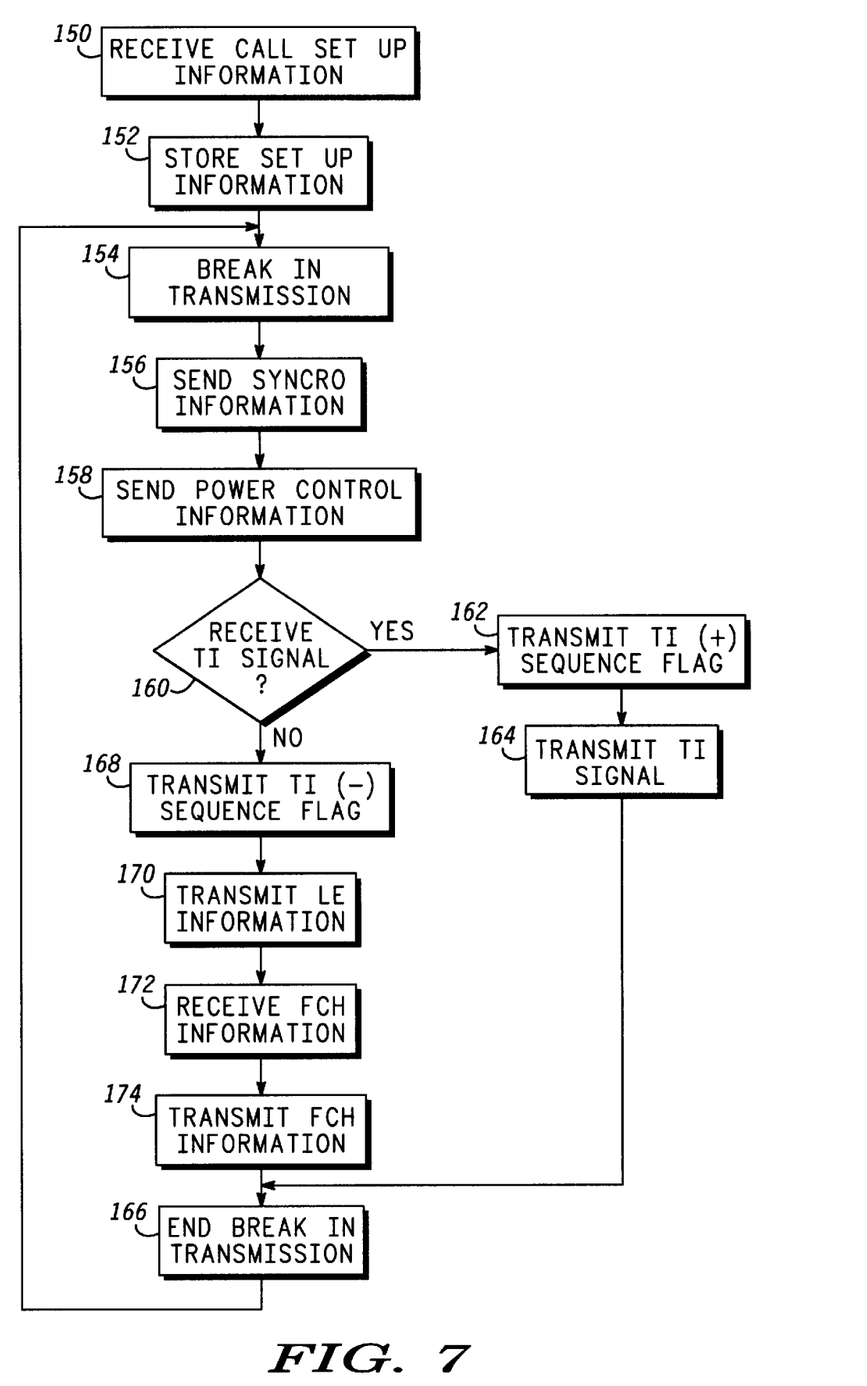
FIG. 7 is a flow diagram illustrating a methodology for obtaining increased signaling in accordance with the present invention.

In view of the foregoing structure and signal diagrams, the operation of an intelligent repeater can be better appreciated with reference to FIG. 7. FIG. 7 is a flow diagram illustrating a methodology to increase signaling in accordance with an aspect of the present invention. The methodology can be implemented based on computer-executable instructions stored at an intelligent repeater in accordance with an aspect of the present invention. While, for purposes of simplicity of explanation, the methodology is shown and described as a series of steps, it is to be understood and appreciated that the present invention is not limited by the order of steps, as some steps can, in accordance with the present invention, occur in different orders and/or concurrently with other steps from that shown and described herein. For example, those skilled in the art will understand and appreciate that a methodology could alternatively be represented as a series of interrelated states, such as in a state diagram. Moreover, not all illustrated steps can be required to implement a methodology in accordance with an aspect the present invention.

The methodology begins at step 150 in which call set up information is received at a repeater programmed and/or configured in accordance with the present invention. A communications unit initiating a call sends the call set up information. The call set up information includes LE information and/or other operating characteristics provided by the initiating communications unit. The LE information, for example, includes an identifying characteristics (e.g., an ID number) of the caller and each intended recipient of the call (e.g., ID number for a single communications unit or a group of units). The call set up information also can include operating characteristic information, such as synchronization data and/or timing information for periodic breaks in transmission at the initiating unit. From step 150, the process proceeds to step 152.

At step 152, at least some of the received set up information, which can include the LE information and other control information, is stored in associated memory. The process then proceeds to step 154 in which is a break in the transmission. The break in transmission, for example, corresponds to a regularly scheduled break implemented at the initiating communications unit. By way of example, during steady state operation at the initiating communications unit, protocol is implemented to define a transmission break (e.g., about 40 ms) to occur at regularly scheduled intervals (e.g., about every 720 ms). Periodic resynchronization between the repeater and the communications units can be employed to facilitate tracking of the breaks in transmission. Alternatively, data could be sent out to synchronize the respective communications units. The process proceeds to step 156.

At step 156, synchronization information is sent, such as indicated at 78 in FIG. 5 and at 112 in FIG. 6. Next, at step 158, power control information is transmitted by the repeater. The power control information is intended for the original transmitting unit 14. This transmission occurs during the break in transmission. The process then proceeds to step 160

At step 160, a determination is made as to whether a TI message has been received, such as from another of the communications units in the call session. If the determination is affirmative, the process proceeds to step 162, in which the repeater sends a TI (+) flag sequence to the initiating unit. The TI flag indicates that a TI signal is going to be sent during the break in transmission. The repeater, for example, transmits the TI flag sequence in response to receiving a synchronization message sent by a communications unit that desires to send the TI message. As a result, the initiating unit remains in a receive mode operable to receive the TI message. From step 162, the process proceeds to step 164.

At step 164, the transmit interrupt message is transmitted for receipt by the initiating communications unit. Next, the process proceeds to step 166, in which the break in transmission ends. As mentioned above, the break in transmission by the initiating communications unit can have a predetermined duration.

If the determination back at step 160 is negative, indicating that a transmit interrupt signal is not received, the process proceeds to step 168. At step 168, a TI (−) flag sequence, such as one or more bits of data, is transmitted for receipt by the communications units. The TI sequence flag, in this situation, indicates that a determination has been made that a TI message is not going to be sent during the transmission break. As a result, the initiating communications unit sets up to transmit FCH (forward channeling) information or other low rate data during its break in transmission. The process proceeds to step 170.

At step 170, LE (late entry) information is transmitted by the repeater based on the LE information stored in its associated memory. By having the repeater (in contrast to the initiating communications unit) determine to send and also send the LE information, processing delays and signal propagation delays can be mitigated. As a result, the overall signaling within the system can be increased.

Next at step 172, such as can occur during the transmission of the LE information at the repeater, FCH information is received at the repeater. At step 174, the received FCH information is, in turn, transmitted for receipt by the intended recipients of the call information. From step 174, the process proceeds to step 166 in which the transmission break ends. Next, the process returns to step 154 to detect the next break in transmission, such as after predetermined time interval.

Note that the invention described herein requires a distributed algorithm to be implemented at the repeater as well as at the participating units. FIG. 7 describes the part of this distributed algorithm that runs on the repeater (unit 12). Corresponding complementary algorithms have to be implemented on units 14, 16, 18, etc.

What has been described above includes one or more examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the terms "includes" and variations thereof and "having" and variations thereof are used in either the detailed description or the claims, such term is intended to be inclusive in a manner similar to the term "comprising."

What is claimed is:

1. A system to provide increased signaling in a communications system, comprising:
   a repeater system operable to receive and store operating characteristic data from an initiating communications unit which has established a call to one or more other communication units,
   the repeater system transmitting at least some of the stored operating characteristic data during a detected break in transmission of the established call from the initiating communications unit to one or more other communication units.

2. The system of claim 1, wherein the operating characteristic data includes late entry information from an initiating communications unit which initiated a call.

3. The system of claim 1, wherein, during the break in transmission, the repeater system also transmits power control information at a fixed temporal position that minimizes the time wasted due to repeater delay during the break in transmission.

4. The system of claim 1, wherein the repeater system further transmits an indicator message during the break in transmission to instruct the initiating communications unit to control its operation during the break in transmission based on a characteristic of the indicator message.

5. The system of claim 4, wherein the repeater system transmits the indicator message having a first characteristic in response to receiving a corresponding indicator message from another communications unit, the corresponding indicator message indicating an intended transmission of a transmit interrupt message by the another communications unit.

6. The system of claim 4, wherein the repeater system transmits the indicator message having a second characteristic in response to not receiving a corresponding indicator message from another communications unit, the initiating communications unit being operable to transmit data in response to the indicator message.

7. The system of claim 1, wherein the operating characteristic data further includes at least a portion of call set up information received from an initiating communications unit.

8. An intelligent repeater comprising:
   a receiver operable to receive communications signals from at least one communications unit;
   a processor operable to store operating characteristic data based on the received communications signals from an initiating communications unit which has established a call to one or more other communication units; and
   a transmitter operable to transmit communications signals, the processor controlling the transmitter to transmit at least some of the stored operating characteristic data in response to detecting a break in transmission of the established call from the initiating communications unit to one or more other communication units.

9. The repeater of claim 8, wherein the operating characteristic data includes call set up information received from an initiating communications unit which initiated a call.

10. The repeater of claim 9, wherein the call set up information further includes late entry information to facilitate entry of another communications unit into the call, the at least some of the stored operating characteristic data including the late entry information.

11. The repeater of claim 9, wherein the call set up information further includes data defining scheduled breaks in transmission by the initiating communications unit.

12. The repeater of claim 8, wherein, during the break in transmission, the processor controls the transmitter to transmit power control information at a fixed temporal position that minimizes the time wasted due to repeater delay during the break in transmission at a fixed temporal position that minimizes the time wasted due to repeater delay during the break in transmission.

13. The repeater of claim 8, wherein, during the break in transmission, the processor further controls the transmitter to transmits an indicator message to instruct the initiating communications unit to control its operation during the break in transmission based on the indicator message.

14. The repeater of claim 13, wherein the indicator message has a first characteristic in response to the receiver receiving a corresponding indicator message from another communications unit, the corresponding indicator message indicating an intended transmission of a transmit interrupt message by the another communications unit.

15. The repeater of claim 13, wherein the indicator message has a second characteristic in response to not receiving a corresponding indicator message from another communications unit, the initiating communications unit being operable to transmit data in response to the indicator message.

16. The repeater of claim 13, wherein the processor controls the transmitter to transmit a late entry message following the indicator message in response to an absence of a corresponding indicator message from another communications unit during the break in transmission.

17. A method to increase signaling at an intelligent repeater, comprising the steps of:
   storing operating characteristic data received from a communications unit initiating a call to one or more other communication units;
   detecting a break in transmission; and
   transmitting at least some of the stored operating characteristic data during the detected break in transmission of the established call from the initiating communications unit to one or more other communication units.

18. The method of claim 17, wherein the at least some of the stored operating characteristic data includes late entry information, the method further including transmitting power control information during the detected break in transmission.

19. The method of claim 17, wherein, during the break in transmission, the method further includes the step of transmitting an indicator message to instruct an initiating communications unit to control its operation during the break in transmission based on the indicator message.

20. The meted of claim 19, wherein the late entry information is transmitted following the indicator message in response to an absence of a corresponding indicator message from another communications unit during the detected break in transmission.

21. A system to provide increased signaling in a communications system, comprising:
   a repeater system operable to receive and store operating characteristic data from a communications unit,
   the repeater system transmitting at least some of the stored operating characteristic data during a detected break in transmission, and
   the repeater system further transmitting an indicator message during the break in transmission wherein the indicator message has a first characteristic in response to receiving a corresponding indicator message from another communications unit, the corresponding indicator message indicating an intended transmission of a transmit interrupt message by the another communications unit.

22. The system of claim 21, wherein the indicator message during the break in transmission instructs the initiating communications unit to control its operation during the break in transmission based on a characteristic of the indicator message.

23. A system to provide increased signaling in a communications system, comprising:
   a repeater system operable to receive and store operating characteristic data from a communications unit,
   the repeater system transmitting at least some of the stored operating characteristic data during a detected break in transmission, and
   the repeater system further transmitting an indicator message during the break in transmission wherein the indicator message has a characteristic in response to not receiving a corresponding indicator message from another communications unit, the initiating communications unit being operable to transmit in response to the indicator message.

24. The system of claim 23, wherein the repeater further transmits a late entry message following the indicator message in response to an absence of a corresponding indicator message from another communications unit during the break in transmission.

25. A system to provide increased signaling in a communications system, comprising:
   a repeater system operable to receive and store operating characteristic data from a corninunications unit,
   the repeater transmitting at least some of the stored operating characteristic data during a detected break in transmission,
   wherein the operating characteristic data includes call set up information from an initiating communications unit which further includes data defining scheduled breaks in transmission by the initiating communications unit.

26. An intelligent repeater comprising:
   a receiver operable to receive communications signals from at least one coninunications unit;
   a processor operable to store operating characteristic data based on the received communications signals; and
   a transmitter operable to transmit communications signals, the processor controlling the transmitter to transmit at least some of the stored operating characteristic data in response to detecting a break in transmission,
   wherein the operating characteristic data includes call set up information from an initiating communications unit and further includes data defining scheduled breaks in transmission by the initiating communications unit.

* * * * *